United States Patent [19]

Houriez

[11] Patent Number: 5,362,118
[45] Date of Patent: Nov. 8, 1994

[54] WINDOW ASSEMBLY FOR CAB OF A VEHICLE

[75] Inventor: Gerard P. A. J. Houriez, Gerpinnes,

[73] Assignee: Caterpillar Inc., Peoria, Ill.

[21] Appl. No.: 18,588

[22] Filed: Feb. 17, 1993

[51] Int. Cl.$^5$ .............................................. B60J 1/02
[52] U.S. Cl. .................. 296/96.21; 296/190; 49/126
[58] Field of Search ............ 296/96.21, 190, 96.2, 296/86, 89, 201, 146 N; 49/126, 125, 127

[56] References Cited

U.S. PATENT DOCUMENTS

| 788,188 | 4/1905 | Chamberlain | 296/96.21 |
|---|---|---|---|
| 798,447 | 8/1905 | Pfleghar | 296/96.21 |
| 2,317,312 | 4/1943 | Swanson et al. | 20/42 |
| 4,072,338 | 2/1978 | Lawrence et al. | 296/190 |
| 4,518,195 | 5/1985 | Tindall et al. | 296/96.21 X |
| 4,619,479 | 10/1986 | Martin, Jr. | 296/190 |
| 4,792,175 | 12/1988 | Gerber | 296/96.21 X |
| 4,880,269 | 11/1989 | Jensen et al. | 296/190 |
| 4,986,593 | 1/1991 | Lohmann | 296/190 |
| 5,076,635 | 12/1991 | Larkin et al. | 296/190 X |
| 5,096,253 | 3/1992 | Jo et al. | 296/190 |
| 5,192,109 | 3/1993 | Roberts | 296/96.21 X |
| 5,272,836 | 12/1993 | Gerst et al. | 296/96.21 X |

Primary Examiner—Joseph D. Pape
Attorney, Agent, or Firm—Claude F. White

[57] ABSTRACT

A window assembly for an operator's cab of a vehicle includes an upper window section which is movable from a closed position to an open, stored position in the roof of the cab. The window assembly includes first and second upper locking mechanism and first and second lower locking mechanism, and first and second release levers for simultaneously releasing the upper and lower locking mechanism. Current designs of removable windows require difficult and awkward operations to lock and unlock the latching mechanisms and for moving the window between closed and open positions. The subject window assembly incorporates simple and easily operated locking and unlocking mechanisms, as well as a convenient apparatus for moving and storing the opened window sections.

16 Claims, 6 Drawing Sheets

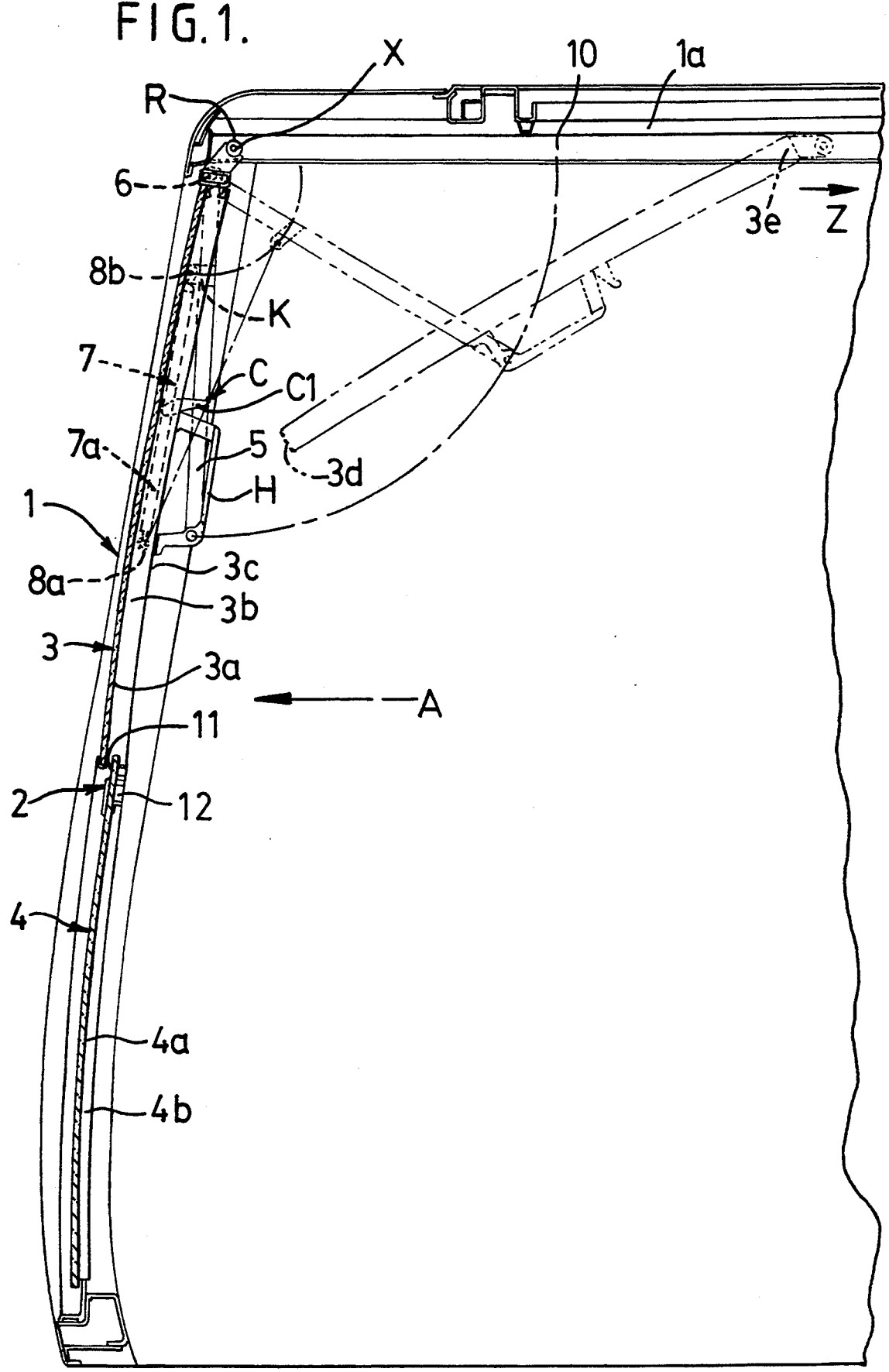

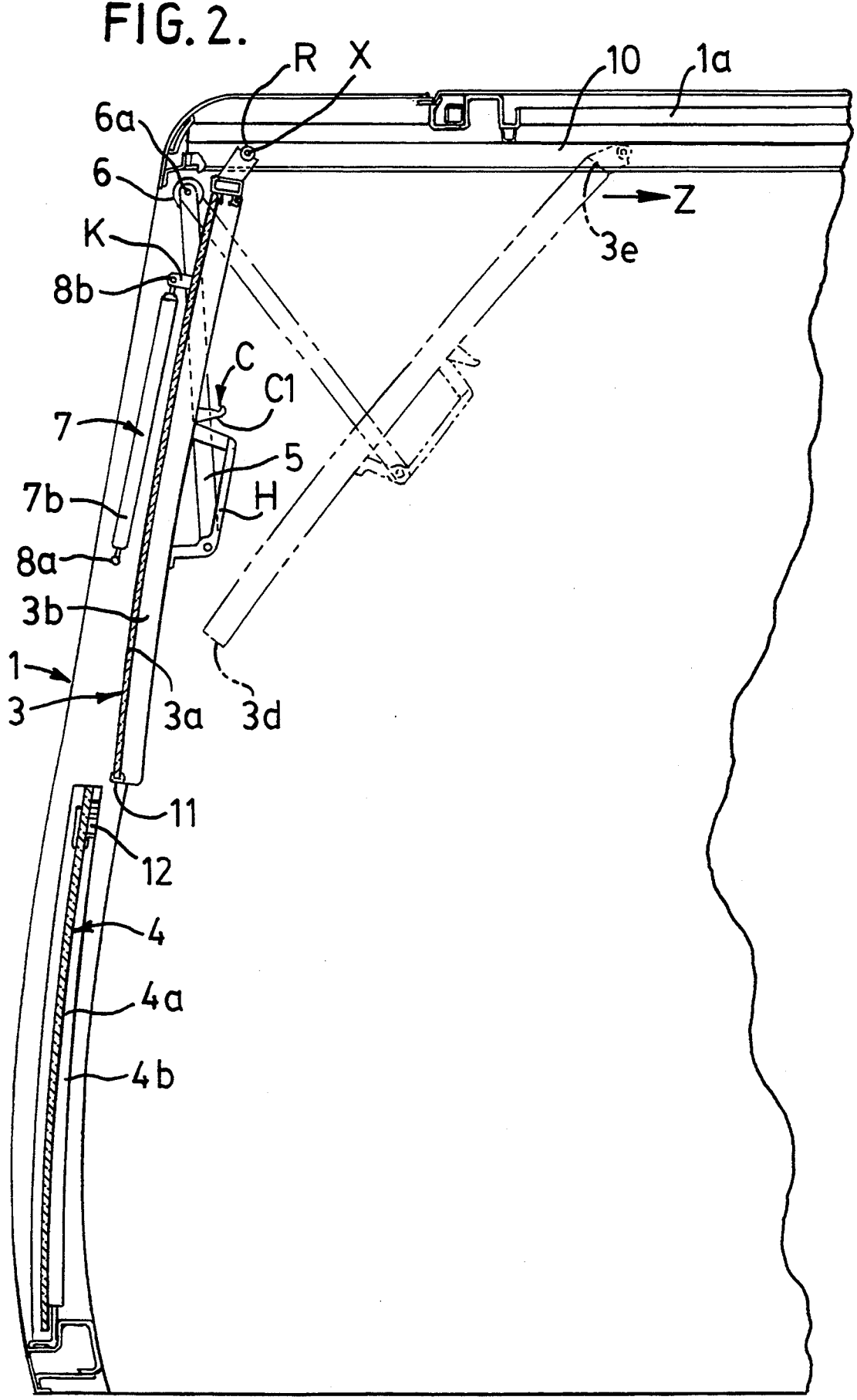

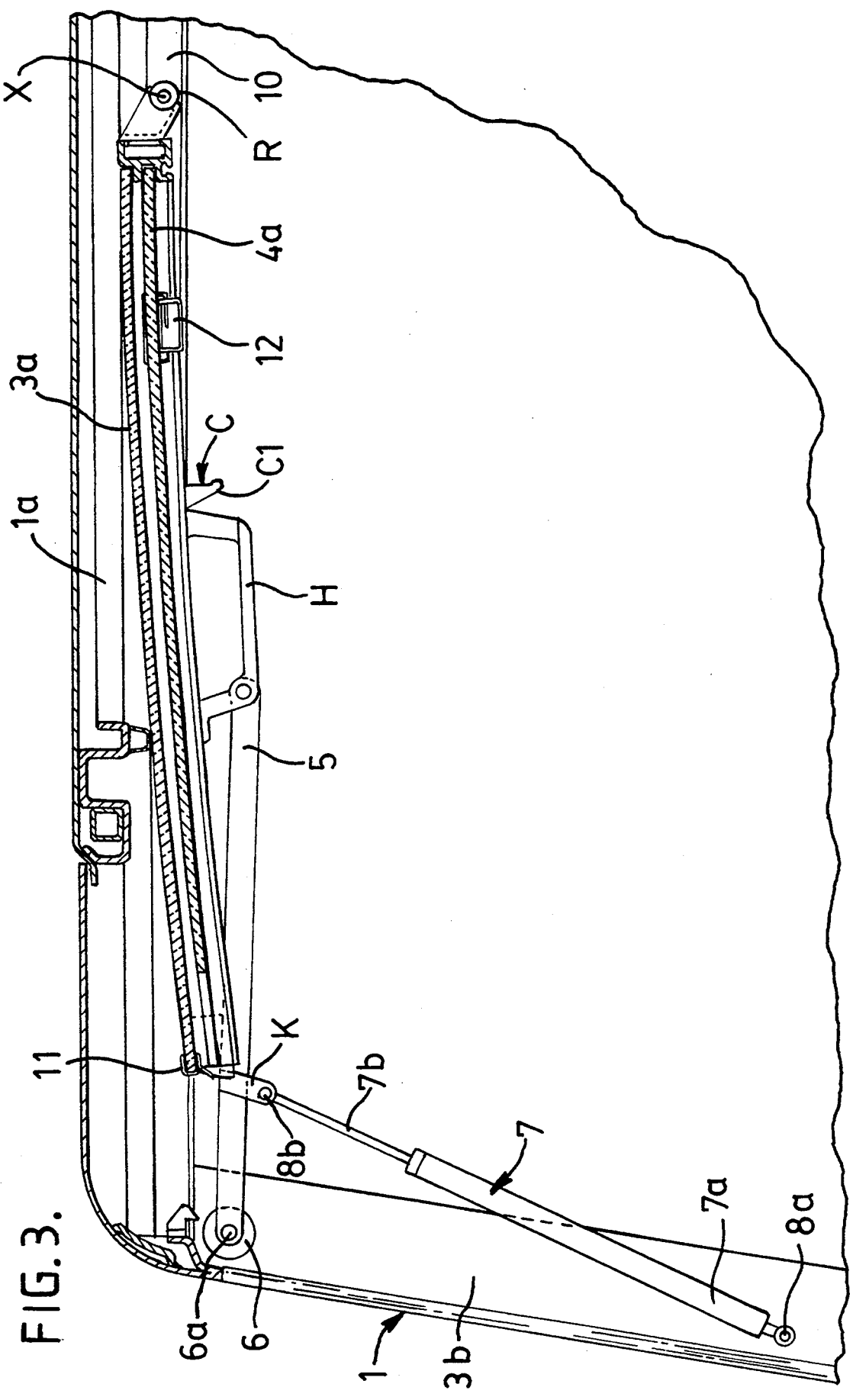

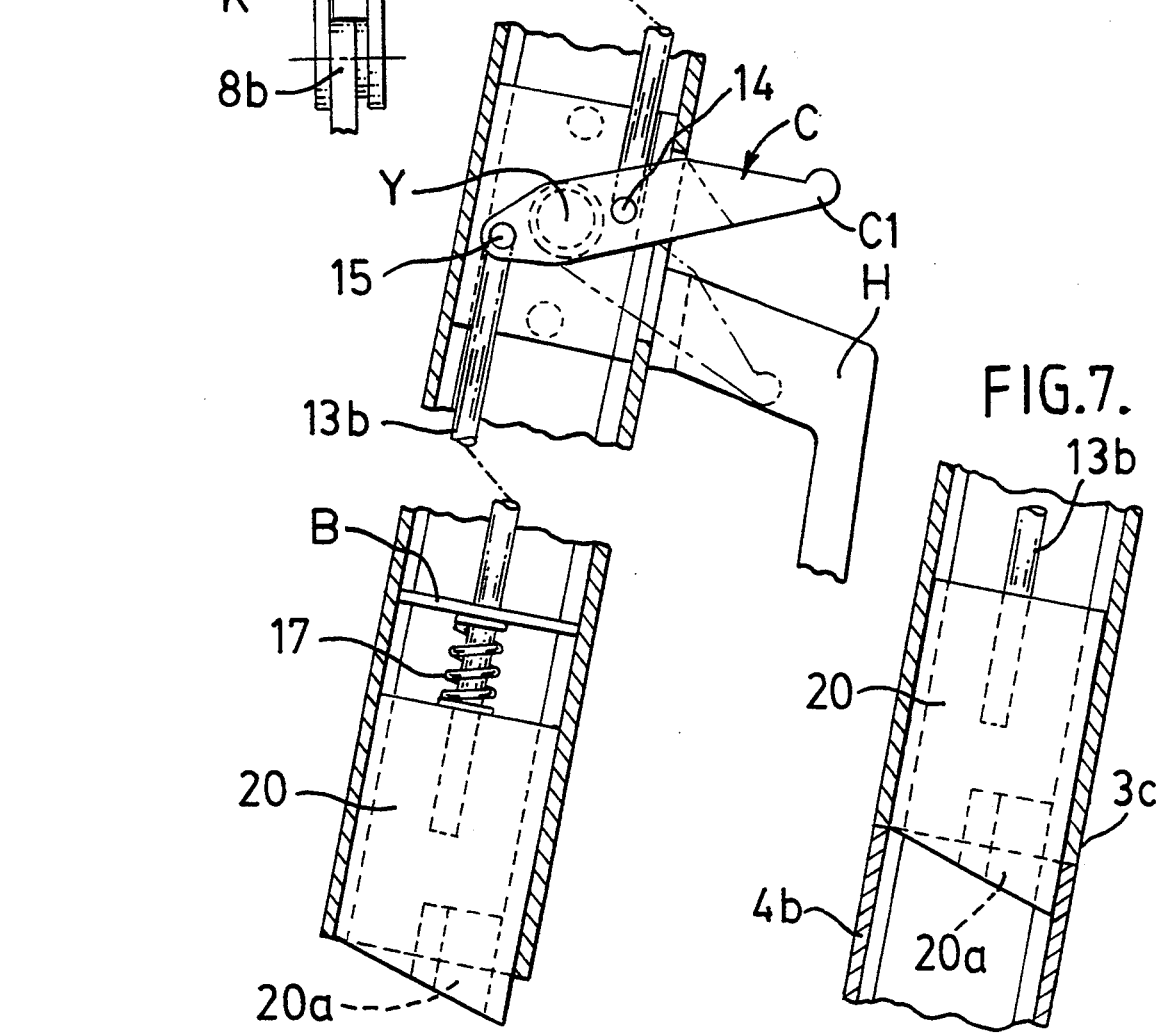

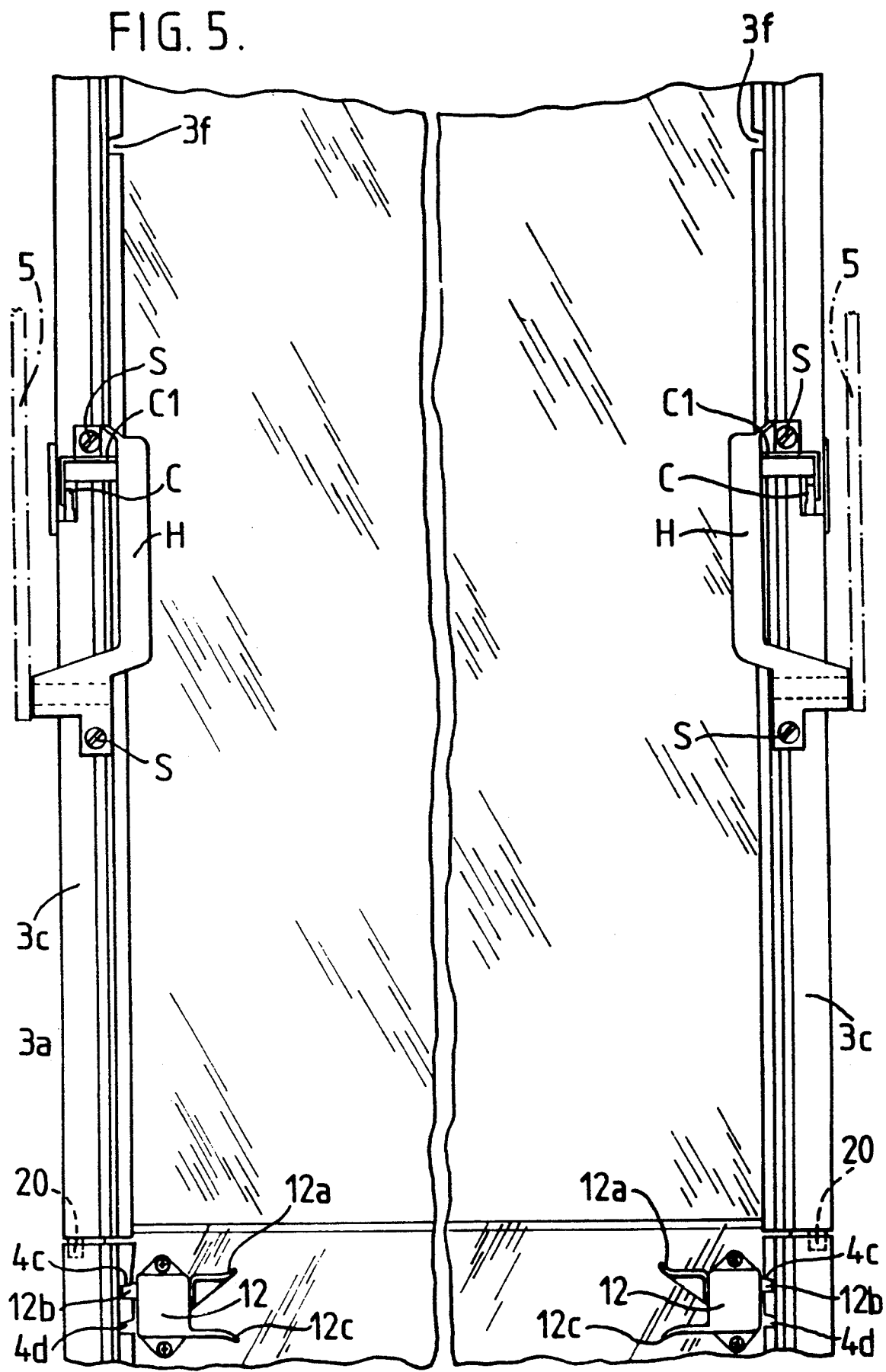

WINDOW ASSEMBLY FOR CAB OF A VEHICLE

TECHNICAL FIELD

This invention relates to improvements in or relating to window assemblies and is more particularly, but not exclusively, concerned with removable window assemblies in earth moving vehicles or tractor cabs or the like.

BACKGROUND ART

It is known, in earthmoving vehicles or the like, to provide the driver's cab with a front window assembly in which the front window can be moved from a closed position to an open position, in which open position the front window is retained to the inside roof of the vehicle. In this open position, the whole of the front of the driver's cab may be completely open. Owing to the nature of the tasks undertaken by earthmoving vehicles or the like, the front window of the driver's cab can become smeared with mud or the like to an extent which is unacceptable to the driver, despite the action of windscreen wipers on the front window. In any event, clearly, drivers favor the facility of being able to move the front window completely out of the way, leaving the front of the cab completely open in certain operating conditions. Current designs of such window assemblies tend to be disadvantageous in some respects. For example, multiple, difficult to co-ordinate operations may be necessary to move the front window between closed and open positions (for example involving separate, awkward operations of locking and unlocking catches in addition to separately gripping widely spaced handles on the window to lift the window into the roof area). The action of moving the window between closed and open positions may be far more complicated or difficult than need be the case, as well as the release and locking action of the window in open and closed positions. In short, it is believed that such window assemblies can be made much more "user friendly". Additional problems may exist in the ease and reliability of opening and closing the window and it is believed that the whole window design may be made much more versatile.

The present invention is directed to overcoming one or more of the aforementioned, or other, problems associated with window assemblies.

DISCLOSURE OF THE INVENTION

In one aspect of the present invention there is provided a window assembly, for example for a driver's cab of an earthmoving vehicle, said assembly comprising two window parts or sections and the arrangement being such that one part or section can be swung about a movable axis to an open out-of-the-way position leaving the window partially closed, said window assembly also preferably being provided with the facility of both parts or sections being swingable to an open out-of-the-way position in which the window is fully open.

In another aspect of the present invention both of said window parts or sections may be swingable to the open out-of-the-way position about said movable axis.

The window assembly, preferably, comprises an upper section comprising an upper pane of glass (or the like) mounted in a frame which is swingable about said movable axis. The window assembly may also comprise a lower frame housing a second window part or section consisting of a second pane of glass (or the like). Where the window parts or sections can be swung about the movable axis to the open out-of-the-way position, preferably, the lower pane of glass is slid from the lower frame up into the upper frame before said upper section is swung to the out-of-the-way position.

The lower pane of glass may be slidably mounted in an open-topped lower frame and may be held at various heights by locking catch means engageable with the lower and/or upper frame member. Preferably, the upper frame member has an open bottom thus allowing the lower pane of glass to be slid in a channel section of the upper frame. The upper pane of glass may be provided with a sealing means or strip engageable with the lower pane in a closed position, said lower pane being movable downwardly relative to the upper pane prior to the upper section being swingable from the closed position to the open stowage position, preferably, in the roof of a driver's cab (where said window assembly is fitted to same).

Preferably, the upper frame is provided with laterally spaced handles that can be gripped while swinging the upper section between closed and open positions. Preferably, said handles incorporate or are associated with finger-operable release catches that can be operated to release the upper section prior to swinging said upper section to the open out-of-the-way position. Preferably, said catches operate actuating rods located in the upper frame member in order to retract spring-loaded locking blocks retaining the upper section in a closed position. Preferably, the window parts or sections that can be swung about said movable axis are assisted by damping means which may be in the form of opposed gas struts, and said swingable window parts or sections are swingable on a pivoting linkage.

In the embodiment of the present invention, where said window assembly comprises upper and lower sections as aforesaid, and laterally spaced handles, the pivoting linkage may comprise linkage members pivotally connected to associated handles and to fixed points of the window assembly (for example the drive's cab where the window assembly is mounted therein). A pair of gas struts may be provided as aforesaid in which one end of each strut is mounted to a fixed point of the window assembly while the other end is pivotally connected to a respective linkage member.

The movable axis may be provided by rollers mounted on said upper frame member with the rollers being entrained to move in channels (arranged in the roof of a cab, where said window assembly is mounted on a cab). The upper window section may be retained in the stowage position by locking means on the upper frame (for example one of the detachable locking blocks) engaging with a stop on the pivoting linkage.

It is an advantage of embodiments of the present invention that one or both window parts or sections of the window assembly can be swung easily and quickly out of the way (by for example a driver sitting in the drive's cab of an earthmoving vehicle) without having to perform awkward multiple unlocking operations. More particularly in one prior art design, handles are widely spaced at top and bottom diagonally spaced locations on a single large front window, thus requiring a particularly awkward gripping and lifting action on the part of the driver to move the window between open and closed positions. Additionally, in this design the driver is required to perform quite exacting unlocking operations on locking catches located at various locations on the window assembly prior to movement of the window itself. The present invention should avoid such difficult operations being necessary.

Therefore, due to the swinging action of the window part or parts about a movable axis, the present invention provides that the window part or sections can be lifted quite easily by a driver over his head, in one movement, between the open and closed positions, avoiding the bottom of the swingable section swinging inwardly towards him in an awkward fashion.

According to a further aspect of the present invention there is provided a window assembly, for example for a driver's cab of an earthmoving vehicle, said assembly comprising a window or window section which can be swung from a closed position about a movable axis to an open out-of-the-way position, by handle means incorporated into or associated with catch means operable to lock and release the window.

An embodiment of a window assembly in accordance with the present invention will now be described, by way of example only, with reference to the simplified diagrammatic drawings.

BRIEF DESCRIPTION OF THE DRAWINGS

FIG. 1 is a diagrammatic part-sectional side view of a window assembly when fitted to a driver's cab of an earthmoving vehicle or the like, the window being in a closed position;

FIG. 2 is a diagrammatic view similar to FIG. 1 but with a lower part or section of the window in a slightly lowered position and an upper section of the window assembly having been moved inwardly ready to be swung up into the roof of the vehicle;

FIG. 3 is a diagrammatic view similar to FIGS. 1 and 2 but with the upper section of the window assembly having been swung into an out-of-the-way storage position in the roof of the vehicle;

FIG. 4 is a diagrammatic cut-away part-sectional side view of the upper window section, drawn to a larger scale and showing additional details;

FIG. 5 is a diagrammatic cut-away front view looking in the direction of arrow A in FIG. 1, also drawn to a larger scale;

FIG. 6 is a diagrammatic sectional view showing further detail of how the upper section of the window assembly is held in the roof of the vehicle;

FIG. 7 is a diagrammatic sectional view showing detail of how the upper and lower window assembly sections are retained to one another in the closed position.

BEST MODE FOR CARRYING OUT THE INVENTION

Figure 8:
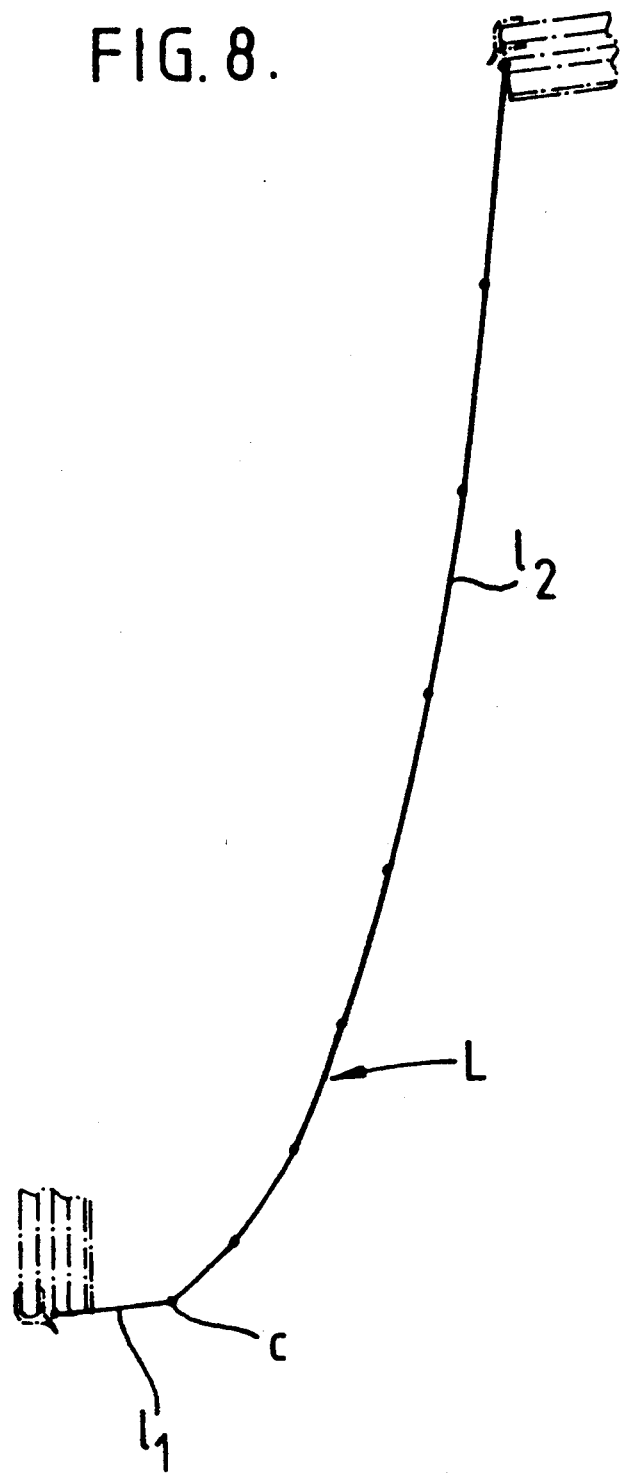
FIG. 8 is a diagrammatic view showing the locus of the lower end of the upper window assembly section moving between the closed and out-of-the-way storage positions.

Referring to the Figures of the drawings, a driver's cab 1 (see FIGS. 1–3 and 5) for an earthmoving vehicle (not shown) or tractor or the like is provided with a front window assembly 2. The Figures of the drawings have been simplified for ease of illustration in a manner which should be appreciated from the following description.

The window assembly 2 comprises two main, upper and lower sections 3,4. In the arrangement as shown, the upper section 3 can be swung about rearwardly movable axis X to an open out-of-the-way position (see FIG. 3) in the roof 1a of the cab 1. Upper section 3 consists of an upper window part or half in the form of a pane of glass (or the like) 3a fixed relative to a frame 3b swingable therewith between open and closed positions. Lower section 4 consists of a lower, window part or half in the form of a pane of glass (or the like) 4a slidably mounted in an open-topped frame 4b in such a manner that the glass plane 4a can be slid upwardly (from the position shown in FIG. 1) into the upper frame 3b, to be swung therewith to the out-of-the-way position shown in FIG. 3. Thus, the window assembly 2 provides the facility of partially opening the window, with said upper section 3 and pane 3a swung to an out-of-the-way position or, if preferred, fully opening the window by swinging the upper section 3 with panes 3a, 4a together into the vehicle cab roof 1a. FIG. 3 depicts the latter case in which pane 4a has been moved up into frame 3b behind pane 3a, prior to swinging upper section 3 to the open or stowage position in the roof 1a.

The upper window section 3 comprises a channel section frame member 3b (part of which is not shown in FIGS. 1 and 2 for ease of illustration), said frame member being open at the bottom. The upper pane of glass 3a has a slight curvature as shown and is fixed to the front of the frame 3b in a manner which should be self-apparent and in a manner which is generally known per se. Laterally opposed handles H are mounted onto respective, opposed side members 3c of frame 3b by screws S (see FIG. 5). The handles H incorporate release catches C, which operate upper and lower locking mechanisms, the operation of which will be described later. Each handle H is pivotally attached to a lower end of a linkage member 5 (shown in chain-dotted lines in FIG. 5) and the upper end of each linkage member 5 is pivotally connected at an upper point of a respective side of the cab 1 at 6 (see FIGS. 1, 2, and 3). Each linkage member pivots about fixed axis 6a. For ease of operation, in order to take the weight of the upper section 3 while being swung between closed and open positions, damping means is provided in the form of a pair of opposed gas struts 7 (only one shown in Figures). A lower end of the gas cylinder 7a of each gas strut 7 is pivotally mounted at 8a to a respective side of the cab 1 while the piston 7b of the gas strut 7 (see FIG. 3) is pivotally mounted at an upper end thereof at 8b to associated connecting link K attached to associated linkage member 5. Laterally opposed rollers R (only one shown in the drawings) are mounted at the top of frame member 3a and these are able to run in channels 10 arranged in the roof 1a of the cab 1 in a manner which should be generally evident from the drawings.

As should be evident from FIG. 1, the bottom of the upper pane of glass 3a is provided with a flexible seal 11 provided with a lower sealing edge that seals, in the closed position, against the outer surface of the upper part of the slightly curved, lower pane of glass 4a.

In order to release the upper section 3, for swinging about movable axis X, the lower pane of glass 4a has to be moved downwardly from the position shown in FIG. 1 (to the position as shown in FIG. 2) in order for the sealing edge of the seal 11 to clear the top of the lower pane 4a as it is moved inwardly of the cab 1. Thus, the lower pane of glass 4a is provided with spring catches 12 (see FIG. 5) which are of known type and which will not, therefore, be described in detail. As should be evident from the Figures, the catches 12 include finger levers 12a that can be pressed downwardly toward thumb rests 12c to release locking projections 12b from upper locking notches 4c, thereby allowing downward movement of pane 4a to a second position in which locking projections 12b can engage locking notches 4d on release of finger levers 12a. In this manner the pane 4a can be lowered in its frame 4b to a position clear of upper frame 3b.

Once the lower pane of glass 4a has been moved to its lower position clear of seal 11, it is an easy matter to swing the upper section 3 to an out-of-the-way position in the roof as shown in FIG. 3. FIGS. 1 and 2 illustrate intermediate positions of the upper section 3 and linkage member 5, in chain-dotted lines, throughout the swinging movement between closed and open positions. As should be evident the lower end 3d of the upper section swings inwardly of the cab 1 during the swinging movement (and is not entrained in a channel way or the like) while the upper end 3e of the upper section moves rearward along a linear axis Z. FIG. 8 shows the locus L of the lower end 3d of the upper section 3 between closed and open positions. Locus L has an initial straight path $l_1$, is cuspidate at c, and has a final upwardly and inwardly curved path $l_2$.

First, the handles H are gripped and release catches C are operated by downward pivotal movement of finger levers C1 about mounting pivot axis Y. Referring more particularly to FIG. 4, the release catches C are each pivotally connected to associated upper and lower, cranked, connecting rods 13a, 13b at associated, diametrically opposed pivot points 14 and 15. The rods 14 and 15 are arranged in a generally parallel fashion within respective side channel sections 3c of the frame 3b. As should be evident from FIG. 4, downward pivotal movement of finger lever C1 about axis Y moves the upper rod 13a downwardly against spring biasing provided by helical, compression spring 16 while simultaneously moving the lower actuating rod 13b upwardly against spring biasing provided by helical, compression spring 17. Springs 16 and 17 each surround their respective rod end and seat between an associated base plate B fixed in the associated frame channel and an inner end of an associated locking block 18,20. Thus, upper locking block 18 fixed at the upper end of rod 13a is pulled downwardly by rod 13a against the action of spring 16 (bearing an associated base plate B) until locking projection 18a is clear of catch 19 fixedly mounted in the roof 1a of the cab 1 as shown. Simultaneously, lower locking block 20 is moved upwardly against the action of spring 17 (bearing on associated base plate B) until it is fully retracted within the frame member 3b, so that it no longer seats in the associated channel of lower frame member 4b. Thus, the upper section 3 is released simultaneously at the top and bottom and can now be moved inwardly to the position as shown in FIG. 2, by pulling on the handles H, at which point in time pressure on finger levers C1 can be released before swinging the upper section up into the roof 1a of the vehicle cab 1.

Next, the upper section 3 can be swung by the handles H quite easily by the driver (in a somewhat similar manner to the swinging of an up and over garage door apart from swinging in of the lower end 3d of upper section 3 which aids in the swinging movement) through the various positions shown in FIGS. 1 and 2 in chain-dotted lines to the position as shown in FIG. 3. Advantageously, the linkage members 5 provide that the lower end 3d of upper section 3 does not move further inwardly of the cab than the upper end 3e for much easier operation by the driver. During this movement the axis X about which the upper section 3 swings will slide rearwardly of the vehicle cab 1 while the rollers R run in the respective channel sections 10, in a manner which should be readily apparent. During this time, the gas struts 7 will act as damping means and should the linkage members 5 move over center, the gas struts will continue to assist in the upward swinging movement of the upper section 3 restraining the upper section from swinging rapidly downwardly towards the closed position should the handles H be released for any reason. Thus, the gas struts 7 act to take some of the weight of the upper section 3 as it is swung to the closed position.

It should now be clear that the upper section 3 can be swung upwardly with the fixed pane 3a or with both the panes 3a and 4a (as shown more particularly in FIG. 3). Of course, if it is desired to swing the upper section 3 with the lower pane of glass 4a, instead of the pane of glass 4a initially being moved to a lower position it is slid upwardly (by holding the catches 12) within the channel section of the frame member 3b to a position in which the locking projections 12b engage in locking notches 3f (see FIG. 5). At this point the lower end of the pane of glass 4a is completely clear of the upper, open end of the frame 4b.

FIG. 6 illustrates how the upper section 3 is retained in the open out-of-the-way position shown in FIG. 3. The upper section 3 is retained in the out-of-the-way position by means of projection 20a of associated locking block 20 resting on associated connecting link K, in a manner which should be evident from the drawings.

FIG. 7 shows a detail of locking block 20 engaging in the frame channel section 4b of lower window section 4, in the closed position.

Other aspects, objects, and advantages of this invention can be obtained from a study of the drawings, the disclosure and the appended claims.

I claim:

1. A front window assembly for the driver's cab of a vehicle, said cab having a roof portion, comprising:
    an upper window section having top and bottom portions, a first pane of glass, and a first frame structure enclosing said first pane, said upper window section being adapted to move from a closed lower position to an open, upper stored position adjacent said roof portion;
    first and second upper locking mechanisms associated with the top portion of said upper section;
    first and second lower locking mechanism associated with said bottom portion of said upper section;
    a first release lever adapted to simultaneously release the first upper and lower locking mechanisms; and
    a second release lever adapted to simultaneously release the second upper and lower locking mechanisms.

2. A window assembly, as set forth in claim 1, wherein said upper window section includes first and second opposed side members, and first and second handles connected to respective first and second side members, said first and second handles being positioned adjacent respective first and second release levers.

3. A window assembly, as set forth in claim 1, wherein said cab roof portion has first and second locking catches, and said first and second upper locking mechanism include first and second locking projections, said projections being adapted to engage respective first and second locking catches in the closed position of said upper window section.

4. A window assembly, as set forth in claim 1, wherein said cab roof portion has first and second spaced parallel channels, said top portion of said upper window section having first and second spaced parallel rollers, said rollers being positioned in respective channels and being adapted to travel in a linear direction in said channels when said upper window section is moved from said closed position to said open, stored position.

5. A window assembly, as set forth in claim 1, including first and second upper cranked connecting rods and first and second lower cranked connecting rods, said upper connecting rods being connected to respective first and second upper locking mechanisms and to said first and second release levers, and said lower connecting rods being connected to respective first and second lower locking mechanisms and to said first and second release levers.

6. A window assembly, as set forth in claim 1, wherein said cab includes a roof portion having first and second spaced parallel channels, said top portion of said upper window section having first and second spaced parallel rollers, said rollers being positioned in respective channels and being adapted to travel in a linear direction in said channels when said upper window section is moved from said closed position to said open, stored position.

7. A window assembly, as set forth in claim 1, including first and second linkage members and first and second gas cylinders, each cylinder having a first end pivotably connected to said cab and a second end pivotably connected to a respective linkage member.

8. A window assembly, as set forth in claim 1, wherein each of said upper and lower locking mechanisms includes a locking block and means for biasing each locking block toward a locked position.

9. A window assembly, as set forth in claim 8, wherein said biasing means includes a helical compression spring.

10. A window assembly, as set forth in claim 1, including a lower window section having top and bottom portions, a second pane of glass, and a second frame structure enclosing said second pane, and first and second spaced spring latches connected to said top portion, said spring latches being adapted to latch said second pane of glass to said second frame structure.

11. A window assembly, as set forth in claim 10, wherein said first frame structure has an open bottom portion and said second frame structure has an open top portion.

12. A window assembly, as set forth in claim 10, wherein said first frame structure includes first and second spaced side portions, each side portion having a locking notch, said spring latches each having a locking projection adapted to engage said locking notches when said second pane is positioned adjacent said first pane.

13. A window assembly, as set forth in claim 10, wherein said second frame structure includes first and second spaced side portions, each side portion having upper and lower locking notches, said spring latches each having a locking projection adapted to engage said upper notches in a first position of said second pane and to engage said lower notches in a second position of said second pane.

14. A window assembly, as set forth in claim 13, wherein said bottom portion of said upper window section overlaps said top portion of said lower window section with said upper section in said closed position and said second pane in said first position.

15. A window assembly, as set forth in claim 13, wherein said bottom portion of said upper window section is spaced from said top portion of said second pane with said second pane in said second position.

16. A window assembly, as set forth in claim 14, including a flexible seal positioned between said bottom portion of said upper window section and said top portion of said lower window section.

* * * * *